(12) United States Patent
Nguyen et al.

(10) Patent No.: US 10,677,717 B2
(45) Date of Patent: Jun. 9, 2020

(54) COLORIMETRIC ANALYZER WITH REAGENT DIAGNOSTICS

(71) Applicant: Rosemount Inc., Shakopee, MN (US)

(72) Inventors: Hoang M. Nguyen, Irvine, CA (US);
Jeffrey L. Lomibao, Corona, CA (US);
Chang-Dong Feng, Long Beach, CA (US)

(73) Assignee: Rosemount Inc., Shakopee, MN (US)

( * ) Notice: Subject to any disclaimer, the term of this patent is extended or adjusted under 35 U.S.C. 154(b) by 200 days.

(21) Appl. No.: 15/605,255

(22) Filed: May 25, 2017

(65) Prior Publication Data

US 2018/0095027 A1    Apr. 5, 2018

Related U.S. Application Data

(60) Provisional application No. 62/402,069, filed on Sep. 30, 2016.

(51) Int. Cl.
*G01N 21/25* (2006.01)
*G01N 21/78* (2006.01)
*G01N 21/77* (2006.01)

(52) U.S. Cl.
CPC .......... *G01N 21/251* (2013.01); *G01N 21/78* (2013.01); *G01N 2021/7763* (2013.01)

(58) Field of Classification Search
CPC ................. G01N 21/251; G01N 21/78; G01N 2021/776; G01N 21/255; G01N 33/18;
(Continued)

(56) References Cited

U.S. PATENT DOCUMENTS 5,674,699 A * 10/1997 Saunders ......... G01N 33/54313
                                                                       435/7.1
5,963,319 A * 10/1999 Jarvis ....................... G01J 3/44
                                                                       356/301
(Continued)

FOREIGN PATENT DOCUMENTS

CN             104903702 A      9/2015

OTHER PUBLICATIONS

First Office Action dated Jan. 19, 2018, for Chinese Utility Model Patent Application No. 201721035260.8, 4 pages including English translation.
(Continued)

*Primary Examiner* — Lore R Jarrett
(74) *Attorney, Agent, or Firm* — Christopher R. Christenson; Kelly, Holt & Christenson PLLC

(57) ABSTRACT

A colorimetric analyzer includes a reaction chamber configured to receive a sample and at least one reagent. A measurement cell is operably coupled to the reaction chamber. The measurement cell has an illumination source and an illumination detector spaced from the illumination source such that illumination from the illumination source passes through the measurement cell to the illumination detector. A controller is coupled to the illumination source and the illumination detector. The controller is configured to determine an absorbance of a reducing reagent and store the determined reagent absorbance in the analyzer. The controller is configured to use the determined reagent absorbance to compensate at least one subsequent colorimetric sample measurement.

8 Claims, 3 Drawing Sheets

(58) Field of Classification Search
CPC ...... G01N 31/22; G01N 21/11; G01N 1/4077;
G01N 31/02; G01N 21/01; G01N
21/3103; G01N 2201/0612; G01N
2201/062; G01N 2201/127; G01N 21/21;
G01N 2021/7763; G01N 21/31; G01N
2201/061; G01N 21/15; G01N 21/27;
G01N 2021/8416; G01J 4/04; G01F
23/2921; G01F 23/292
See application file for complete search history.

(56) References Cited

U.S. PATENT DOCUMENTS

| | | | | |
|---|---|---|---|---|
| 7,381,564 B2* | 6/2008 | Matschenko | .......... | G01N 21/78 436/164 |
| 2015/0099304 A1* | 4/2015 | Butcher | ................. | G01N 21/78 436/72 |

OTHER PUBLICATIONS

Office Action dated Feb. 21, 2020 for Chinese Patent Application No. 201710709857.4, 21 pages including English translation.

* cited by examiner

COLORIMETRIC ANALYZER WITH REAGENT DIAGNOSTICS

CROSS-REFERENCE TO RELATED APPLICATIONS

The present application is based on and claims the benefit of U.S. Provisional Patent Application Ser. No. 62/402,069 filed Sep. 30, 2016, the content of which is hereby incorporated by reference in its entirety.

BACKGROUND

Online wet chemistry analyzers are used in a variety of industries to provide a continuous indication of an analyte in a process sample. This continuous indication can be provided locally by the analyzer and/or remotely to one or more suitable devices in order to provide control and/or monitoring of a chemical process.

One particular example of an online wet chemistry analyzer is an online automatic colorimetric analyzer. Such devices are configured to generate a reaction in the process sample that creates a visual indication relative to the process sample. This visual indication is measured by an optical sensor or light detector in order to provide an indication relative to the reaction. Colorimetric analysis is used in a variety of settings ranging from medical laboratories to industrial wastewater treatment facilities. Such analysis may be used with or without an enzymatic stage and is applicable to detecting both inorganic and organic compounds. Colorimetric techniques are known for detecting calcium, copper, creatine, iron, phosphate, cholesterol, glucose, urea, trigylcerides, and silica.

One particular example of an automatic colorimetric analyzer is an online silica analyzer that employs a known reaction to render the silica in the process sample readily detectable. One example of such a reaction is known as the molybdenum blue method. In the molybdenum blue method, molybdate (usually in the form of potassium molybdate) is used to react with silica in the process sample in order to generate a compound suitable for colorimetric detection. In accordance with the molybdenum blue method, the silica content in water is measured based on the color of the silicomolybdic acid formed through the wet chemistry process. The molybdenum blue method can also be used for colorimetric qualitative analyses of phosphorous, arsenic, and germanium.

In online wet chemistry analyzers that utilize optical measurement techniques, it is important to facilitate an effective optical measurement. Aspects or properties of the sample or reagents that may interfere with the optical measurement that are not related to the presence or concentration of the analyte, generate measurement errors. Therefore, identifying and/or reducing such artifacts is beneficial in order to obtain higher precision and fidelity in optical colorimetric measurements.

SUMMARY

A colorimetric analyzer includes a reaction chamber configured to receive a sample and at least one reagent. A measurement cell is operably coupled to the reaction chamber. The measurement cell has an illumination source and an illumination detector spaced from the illumination source such that illumination from the illumination source passes through the measurement cell to the illumination detector. A controller is coupled to the illumination source and the illumination detector. The controller is configured to determine an absorbance of a reducing reagent and store the determined reagent absorbance in the analyzer. The controller is configured to use the determined reagent absorbance to compensate at least one subsequent colorimetric sample measurement.

DETAILED DESCRIPTION

An analyzer, in accordance with embodiments of the present invention, can be used in any continuous process wherein reagents are mixed with a continuous stream of a liquid to be tested. For purposes of explanation only, embodiments of the invention are described as they would be used to test for the presence of soluble silicates (silica) for example in power plants where the presence of such silicates is undesirable because of their tendency to coat the turbine blades.

In a typical industrial use, it may be desirable to maintain the level of silica at 20 ppb. For purposes of explanation only, an embodiment of the present invention will be described as part of an automated continuous system for measuring the amount of silicate present in a continuous flow of water (e.g., from a power plant).

In colorimetric based chemical analysis, such as silica analysis, there is a potential interference caused by the light absorption of the reagent itself. This amount of interference can vary due to manufacturing, shelf life/drift, and delivery methods of the reagent. Embodiments of the present invention provide a system and methods to determine the interference from the reagent accurately and quickly using samples with a broad quality, enabling the use of process sample for on-line automated colorimetric analyzers.

During the silica measurement using a colorimetric method, a chelating reagent is typically added to the sample solution first, forming a complex. In one example, this chelating agent is an acid solution of $Mo^{VI}$, for example ammonium molybdate. Then, a reducing reagent is added to reduce the complex which turns the solution blue. Examples of reducing reagents include ascorbic acid and/or ferrous ion. An absorbance measurement of the blue solution at 810 nm, for example, is then carried out. According to Beer-Lambert law, the absorbance is proportional to the concentration of silica in the sample solution.

When ferrous ion ($Fe^{2+}$) is used as the reducing reagent, the ferrous ion itself exhibits some absorbance at 810 nm. Thus, the absorbance at 810 nm from unreacted ferrous ion will potentially become an error for the measurement, especially when the silica concentration is low.

Figure 1:
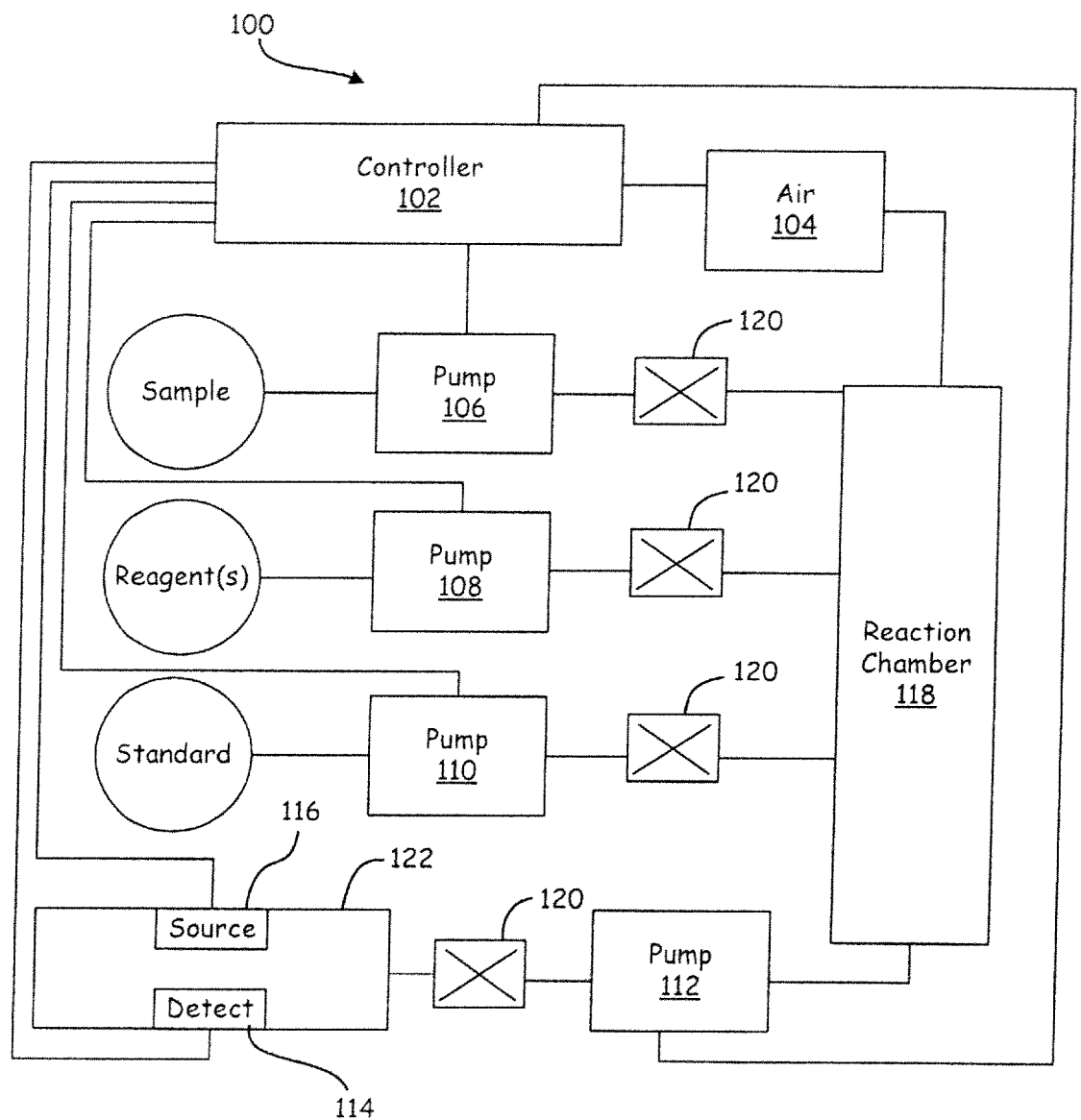
FIG. 1 is a diagrammatic view of an online silica analyzer with which embodiments of the present invention are particularly useful.

FIG. 1 is a diagrammatic view of an online silica analyzer with which embodiments of the present invention are particularly useful. Analyzer 100 includes controller 102 that is coupled to air source 104, and pumps 106, 108, 110, and 112. Additionally, controller 102 is also coupled to illumination source 114 and illumination detector 116. Typically, each pump 106, 108, 110, and 112 is a peristaltic pump that employs peristaltic action to move its respective liquid. Cavity volumes are typically 2.5 mL for sample and standards (pumps 106 and 110) and 0.2 mL for reagents (pump 108). However, any suitable volumes can be used for the sample, standards, and reagents. A number of check valves 120 are provided in order to prevent backflow. When mixing of the sample/reagent/standards is desired, controller 102 engages air source 104 to pump a quantity of air into reaction chamber 118 in order to mix the contents therein. After a suitable reaction time has passed, the treated sample is pumped, using pump 112, to measurement cell 122. Once the mixed sample is provided within measurement cell 122, controller 102 engages illumination source 114 to direct measurement illumination through the mixed sample toward detector 116. For silica, this measurement illumination will be substantially monochromatic having a wavelength of about 810 nm. In accordance with known techniques, the illumination detected by detector 116 provides an indication of the analyte in the sample. For example, for silica, controller 102 automatically calculates the absorbance and translates the results into a silica concentration reading. Once the measurement is complete, repeated flushes with fresh sample remove the treated sample from the measurement and reaction cells, 122 and 118, respectively.

In accordance with an embodiment of the present invention, a reducing reagent absorbance is measured and used to provide a diagnostic output and/or compensate subsequent colorimetric measurements. For example, in an automated silica analyzer based on the colorimetric method, a reagent absorbance measurement process is added to measure the absorbance of the reducing reagent. In this process, the reducing reagent is added to the sample solution with the same reagent-to-sample ratio as used in the silica sample measurement process. Since no chelating reagent was added to the sample, the absorbance measured will be the absorbance from the reducing reagent. The reagent absorbance is saved in the colorimetric analyzer, and used to correct every silica measurement by subtracting the reagent absorbance from the measured absorbance during silica measurements.

Figure 2:
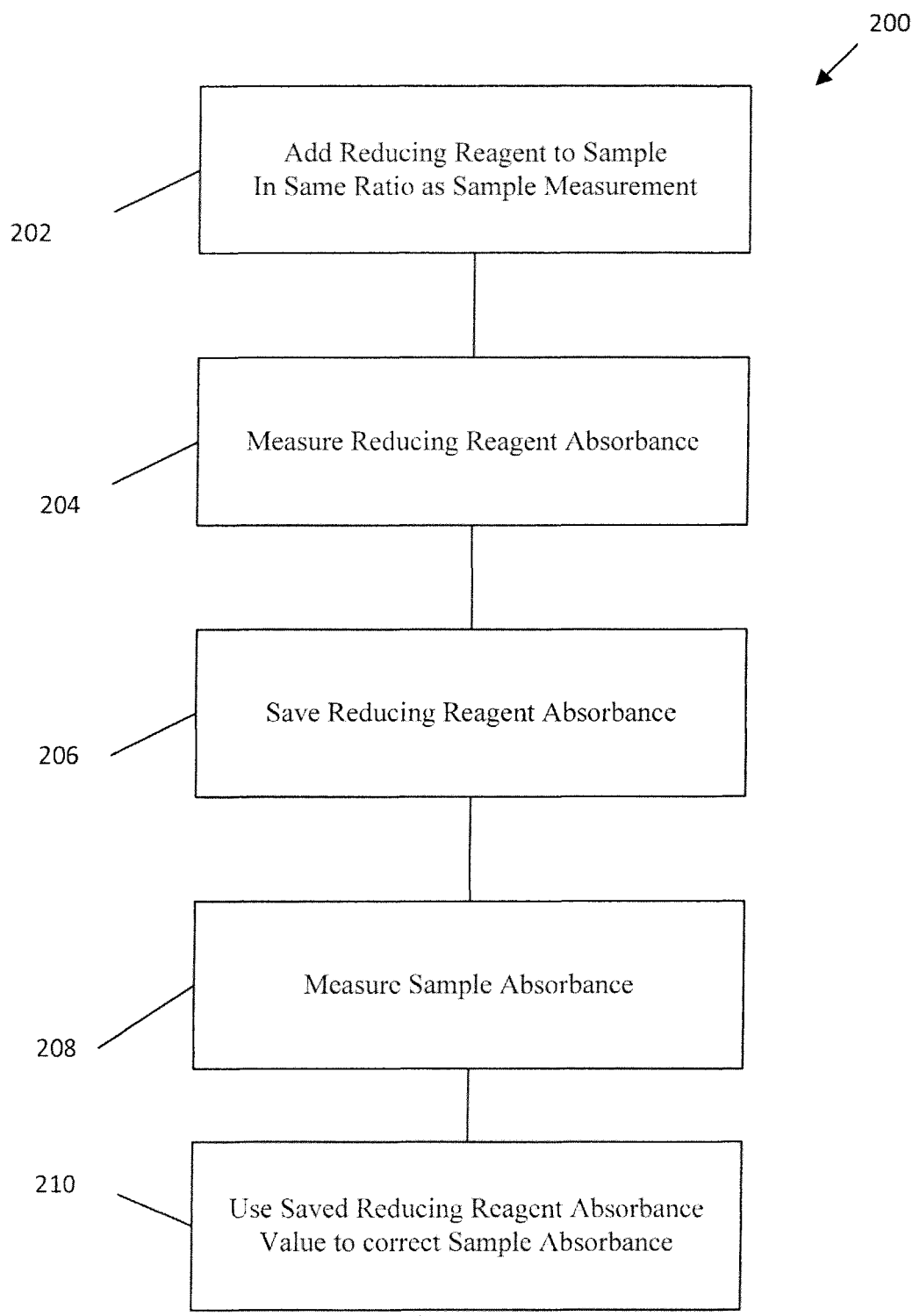
FIG. 2 is a flow diagram of a method of processing a sample in an automatic colorimetric analyzer in accordance with an embodiment of the present invention.

FIG. 2 is a flow diagram of a method of processing a sample in an automatic colorimetric analyzer in accordance with the embodiment of the present invention. Method 200 begins at block 202 where an automatic colorimetric analyzer adds a reducing reagent to a sample in the same ratio as is used during the silica measurement process. However, the chelating agent is not added or present in the sample during the reagent measurement cycle. Thus, although the reagent has been added, the solution does not turn blue. This is particularly useful in that the silica content of the sample can be unknown, yet since the chelating agent was not added, the silica remains unreacted and does not affect the reducing reagent absorbance. Thus, the only absorbance of the measuring illumination is that of the reducing reagent. Next, at block 204, the automatic colorimetric analyzer measures the absorbance of the reducing reagent using source 116 and detector 114. In one embodiment, the measured absorbance is at 810 nm (for example, when used to measure silica with the molybdenum blue method). The measured reducing reagent absorbance is then stored within analyzer 100, preferably in non-volatile memory within controller 102, as indicated at block 206. At block 208, the automatic colorimetric analyzer measures absorbance of a sample, such as a silica sample, after the chelating agent and the reducing reagent have been added. Some of the reducing reagent may not completely react with the complex. As set forth above, the unreacted reducing reagent will exhibit some absorbance of the illumination used for colorimetric analysis. Thus, at block 210, controller 102 uses the stored absorbance value to compensate the silica sample measurement for the absorbance of the unreacted reducing reagent. In one embodiment, the compensation includes subtracting the reducing reagent absorbance from the sample absorbance. The compensated output can then be provided by analyzer 100 in any suitable manner. The method illustrated in FIG. 2 can be performed for each and every sample measurement or at certain intervals of sample measurements (e.g. every 10 measurement) or at intervals of time (e.g. every hour or every day).

Figure 3:
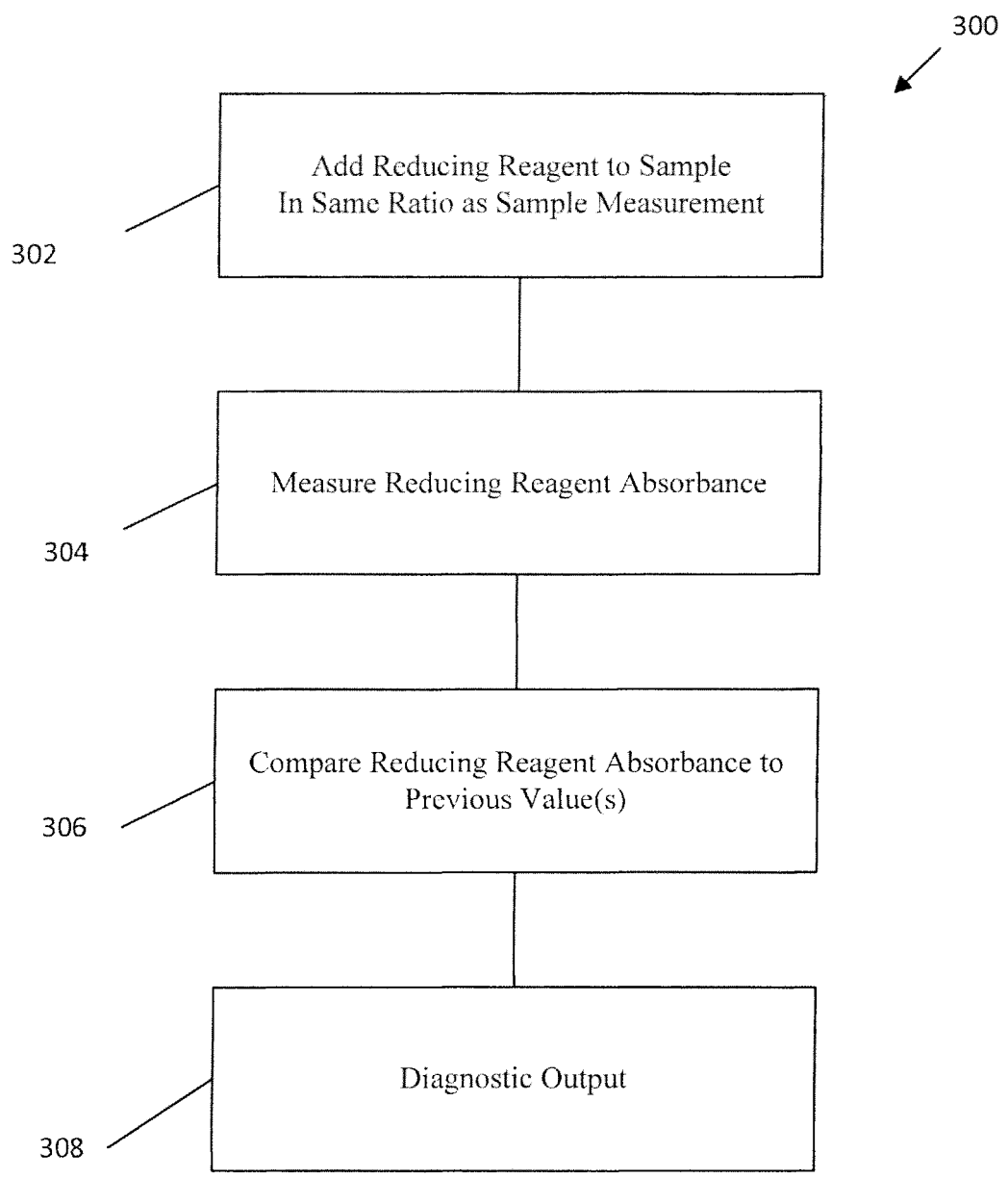
FIG. 3 is a flow diagram of a method or providing reagent diagnostics in a colorimetric analyzer in accordance with an embodiment of the present invention.

FIG. 3 is a flow diagram of a method or providing reagent diagnostics in a colorimetric analyzer in accordance with an embodiment of the present invention. Method 300 begins at block 302 where an automatic colorimetric analyzer adds a reducing reagent to a sample in the same ratio as is used during the sample measurement process. However, the chelating agent is not added or present in the sample during the method 300. Accordingly, the addition of the reducing reagent to the sample does not generate a reaction that produces a colored solution. Next, at block 304, the absorbance of the reducing reagent of the measurement illumination (e.g. 810 nm) is determined. At block 306, the reducing reagent absorbance, determined at block 304, is compared to one or more previous values. This may be done by comparing the absorbance with a manufacturer-set value or threshold that is stored in analyzer. Alternatively, or additionally, previously stored absorbance values can be compared with the determined value is order to identify trends or changes in the reagent absorbance. Any suitable techniques for processing historical reducing reagent absorbance can be used including, without limitation, suitable statistical techniques. At block 308, a diagnostic output is generated based on the comparison and/or analysis performed during block 306. The diagnostic output may be as simple as a local indication that the reducing reagent needs to be replaced.

Although the present invention has been described with reference to preferred embodiments, workers skilled in the art will recognize that changes may be made in form and detail without departing from the spirit and scope of the invention. For example, embodiments of the present invention may be used to provide smart diagnostics for colorimetric analyzers. Such diagnostics can include providing a reagent quality feedback to a user. Such feedback may indicate that the reagent has passed its shelf life or is out of specifications if the interference can be correlated to the concentration of a given reagent. Moreover, while embodiments of the present invention have generally been described with respect to a silica analyzer, embodiments are practicable with any colorimetric analyzer where colorimetric reagents have inherent interference in colorimetric detection and are not affected by the chemistry.

What is claimed is:

1. A colorimetric analyzer comprising:
   a reaction chamber combining a sample and a reducing reagent in the absence of a chelating agent:
   a measurement cell operably coupled to the reaction chamber to receive the combined sample and the reducing reagent, the measurement cell having an illumination source and an illumination detector spaced from the illumination source such that illumination from the illumination source passes through the measurement cell to the illumination detector;
   a controller coupled to the illumination source and the illumination detector, the controller being configured to determine an absorbance of the reducing reagent and store the determined reducing agent absorbance in the analyzer; and wherein the controller employs the determined reducing agent absorbance in a subsequent colorimetric sample measurement with the chelating agent to compensate the subsequent colorimetric sample measurement based on a measurement error caused by the reducing reagent.

2. The colorimetric analyzer of claim 1, wherein the reducing reagent contains ferrous ions.

3. The colorimetric analyzer of claim 2, wherein the ferrous ion is $Fe^{2+}$.

4. The colorimetric analyzer of claim 3, wherein the illumination source provides substantially monochromatic illumination having a wavelength of about 810 nanometers.

5. The colorimetric analyzer of claim 1, wherein the illumination source provides substantially monochromatic illumination having a wavelength of about 810 nanometers.

6. The colorimetric analyzer of claim 1, wherein the controller is configured to subtract the determined absorbance of the reducing reagent flow the subsequent colorimetric sample measurement to provide a compensated subsequent colorimetric sample measurement.

7. The colorimetric analyzer of claim 1, wherein the controller is configured to compare the determined absorbance to a previous absorbance value to provide a diagnostic, output.

8. The calorimetric analyzer of claim 1, wherein the calorimetric analyzer is an online silica analyzer.

* * * * *

UNITED STATES PATENT AND TRADEMARK OFFICE
CERTIFICATE OF CORRECTION

PATENT NO. : 10,677,717 B2
APPLICATION NO. : 15/605255
DATED : June 9, 2020
INVENTOR(S) : Hoang M. Nguyen, Jeffrey L. Lomibao and Chang-Dong Feng Page 1 of 1

It is certified that error appears in the above-identified patent and that said Letters Patent is hereby corrected as shown below:

In the Claims

Column 5, Line 21, Claim 6, delete "flow" and insert --from--

Column 5, Line 27, Claim 7, delete "," after "diagnostic"

Column 5, Line 29, Claim 8, delete "calorimetric" and insert --colorimetric--

Signed and Sealed this
Eighth Day of November, 2022

Katherine Kelly Vidal
*Director of the United States Patent and Trademark Office*